June 20, 1967 K. HILLMAN 3,327,139
CONTROL SIGNAL GENERATOR EMPLOYING A TUNNEL DIODE TO
REGULATE THE AMPLITUDE OF THE CONTROL SIGNAL
Filed Sept. 1, 1964 2 Sheets-Sheet 1

INVENTOR.
KURT HILLMAN
BY
R. J. Frank
ATTORNEY

INVENTOR.
KURT HILLMAN
BY
R. J. Frank
ATTORNEY.

1

3,327,139

CONTROL SIGNAL GENERATOR EMPLOYING A TUNNEL DIODE TO REGULATE THE AMPLITUDE OF THE CONTROL SIGNAL

Kurt Hillman, Flushing, N.Y., assignor to General Telephone and Electronics Laboratories, Inc., a corporation of Delaware Filed Sept. 1, 1964, Ser. No. 393,703

10 Claims. (Cl. 307—88.5)

This invention relates to a control signal generator and more particularly to a control signal generator employing a tunnel diode as a bistable reference element for controlling the amplitude of the generated signal.

The use of quantization in the translation of an analog signal into digital representation has resulted in the increasing use of high speed amplitude comparators. The comparators operate to compare the analog signal with a reference signal and to provide an output when the polarity of the sum of the analog and reference signals reverses. A bistable element capable of stable high sensitivity may be advantageously used as the decision element in the comparator. Accordingly, it is desirable to employ tunnel diodes since they offer the advantages of high sensitivity, resolution, and speed in recovering from an overload of either polarity.

Since bistable amplitude comparators generally operate with the negative resistance portion of their static characteristics offset with respect to the origin of their static characteristic, i.e. the element is only triggered into its second stable state when the applied signal exceeds zero by a prescribed amount, a control signal is generated and applied to the comparator in addition to the analog and reference signals. The control signal establishes the operating bias of the amplitude comparator and is set as close as practical to the triggering or firing level of the bistable element. The difference between the firing level and the amplitude of the control signal is a measure of the sensitivity of the comparator and should be minimized to permit sensitive comparisons to be made with low power signals.

The amplitude of the control signal should be maintained constant and failure to do so adversely affects the comparator throughout the comparison range by resulting in a varying sensitivity. However, even if the control signal amplitude is maintained constant, any drift or variation in the firing level of the bistable element produces the same undesired effect. In the case of a tunnel diode, the firing level is found to drift with temperature variation. This drift may result in either a decrease or increase in the firing level depending on the doping level, the resistivity and the peak voltage of the tunnel diode. This variation of the tunnel diode firing level has resulted in comparators exhibiting a changing sensitivity during normal operation and in addition, has required the control signal to be initially spaced from the firing level by an amount sufficient to insure that the tunnel diode will not be fired by the control signal alone.

Accordingly it is an object of the present invention to provide a control signal generator wherein a tunnel diode is employed to maintain the amplitude of the control signal substantially constant.

An additional object is the provision of a control signal generator for use with an amplitude comparator wherein the amplitude controlling element and the decision making element of the amplitude comparator are matched to have substantially identical characteristics.

Another object is the provision of a stable, amplitude comparison circuit having a substantially constant sensitivity.

A further object is to provide an improved control signal generator.

2

In accordance with the present invention, a control signal generator is provided in which a negative feedback loop, containing a tunnel diode, is used to control the amplitude of the control signal. A tunnel diode and a resistor, connected in series, are connected across the output of a waveform generator so that a current which is a function of the control signal amplitude flows through the tunnel diode reference element. When the peak value of the control signal equals or exceeds the desired magnitude, the current through the tunnel diode triggers it into its second stable or high voltage state. If the control signal peak amplitude falls below the desired level, the current through the reference diode will be less than the diode peak current and the tunel diode will not fire. Thus, the manner of control is digital in the sense that the reference diode either fires or remains in its first stable or low voltage state. Since the tunnel diode fires at or prior to the peak of a cycle, the diode is reset to its first state during the remainder of the control signal cycle.

The diode is responsive to each cycle of the output waveform. When the diode fires, the voltage developed across it increases and then decreases as it is reset. This voltage appears in the form of pulses and is then amplified, inverted and fed to a resistance-capacitance integrator. The voltage appearing across the capacitor of the integrator is determined by the number of times that the tunnel diode fires in a particular interval. By selecting the time constant of the integrator to be substantially larger than the period of the control signal, the voltage appearing across the capacitor increases when the diode fires and decreases when it does not, but the change in voltage is small for individual firings.

The capacitor voltage is coupled to the waveform generator to control or modulate its output to maintain the amplitude thereof at a substantially constant level. The capacitor voltage variation is a function of the ratio of the charge and discharge rates of the capacitor and may be advantageously confined within a range substantially equal to the width of the uncertainty region of the tunnel diode by a reduction in these rates. This zone of uncertainty is a region wherein the internal noise of the diode has a significant effect on the peak current required to fire it and is characterized by the fact that at any point within this region the diode may or may not fire. It is to be noted, however, that outside this region, the diode performance is predictable. For a milliampere tunnel diode, this zone of uncertainty is of the order of 1 microampere. The variation in control signal voltage is maintained by the feedback signal to within less than a few tenths of a percent of the desired magnitude. Thus, the control signal is essentially constant and is well suited for use in a high sensitivity amplitude comparison circuit.

By selecting the reference diode to be similar to that employed in the comparator, any drift in the peak current due to temperature changes affects the firing levels of both the comparison and reference tunnel diodes and is automatically compensated for by a change in the control signal magnitude. A lowering of the reference diode firing point increases the number of firings in a given interval which, in turn, increases the capacitor voltage and provides a greater feedback signal. When inverted, this increased feedback serves to decrease the amplitude of the control signal. The amount of this decrease compensates for the decrease in the firing point of the comparator diode. The speed of correction in which the feedback loop responds to variations in the tunnel diode firing level is also determined by the charge and discharge times associated with the integrator capacitor.

The present comparison circuit provides sufficient response to enable the sensitivity to remain essentially constant for high temperature variations of the diode firing level.

Further features and advantages will become more readily apparent from the following description of a specific embodiment of the invention when viewed in conjunction with the accompanying drawings, in which FIG. 1 is a block diagram of one embodiment of the invention;

Figure 1:
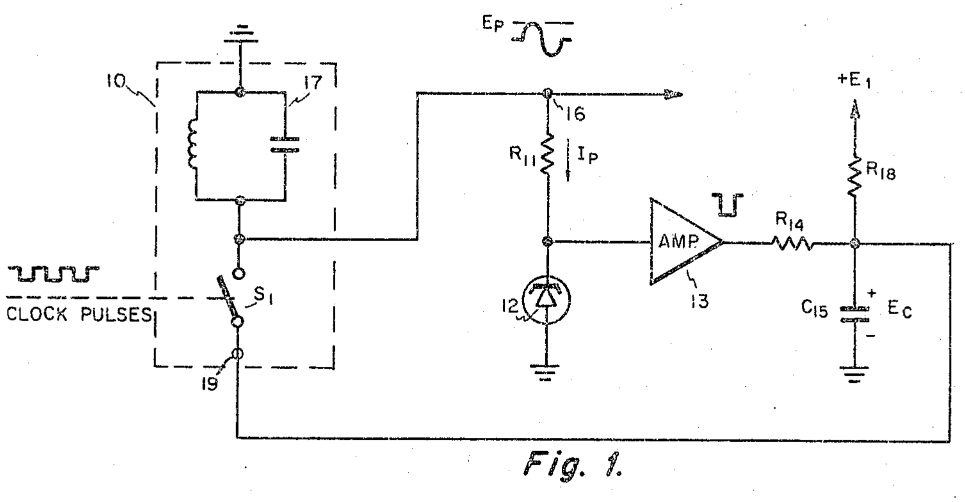

Referring more particularly to FIG. 1, waveform generator 10 is shown having a negative feedback loop associated therewith. The feedback loop includes resistor $R_{11}$ in series with tunnel diode 12 connected across the output of generator 10. Amplifier 13 is connected as a buffer across tunnel diode 12, the output of which is fed to an integrator comprising series resistor $R_{14}$ and shunt capacitor $C_{15}$ and then returned to control generator 10.

Generator 10 may comprise a resonant circuit 17 having a suitable power supply, i.e. a class C amplifier, with the feedback returned to modulate or control the power supply. As shown, switch $S_1$ may be closed in response to clock pulses at the time of the positive peaks of the output signal. Although the following discussion refers to a sinusoidal control signal, it will be understood that other waveform generators may be similarly controlled.

The voltage waveform at output terminal 16 is sinusoidal and the voltage across the series combination of resistor $R_{11}$ and tunnel diode 12 varies accordingly. As shown, the anode of the diode 12 is connected to ground and therefore the feedback circuit is responsive to the negative half-cycle of the output waveform. However, if desired, the diode can be reversed which in turn changes the polarity of the signal feedback to generator 10.

Figure 2:
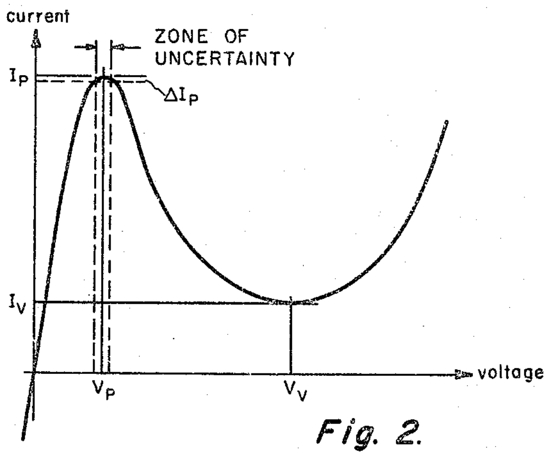
FIG. 2 is a graph showing the current-voltage characteristic of a tunnel diode.

Referring to FIG. 2, the current-voltage characteristic of tunnel diode 12 is shown. As known in the art, the stable states of a bistable element are defined by the portions of the characteristic having a positive slope, with the region of negative slope being the area of unstable operation. Thus, the tunnel diode is trggered into its second stable state characterized by a higher voltage when the current therethrough exceeds the peak current $I_p$. The diode remains in this second state until reset when the current therethrough drops to the valley current level, $I_v$. It is to be noted that this effect is exhibited only in the first quadrant of the characteristic and that for reverse voltages the tunnel diode is essentially a short-circuit.

In the present control signal generator, the current through the tunnel diode is determined primarily by the magnitude of the voltage waveform at terminal 16. When this waveform is sufficient to cause the diode to be fired, the diode traverses the negative resistance or unstable region of its current-voltage characteristic and enters its second stable or high voltage state. Since the diode is fired at or near the peak of the voltage waveform at terminal 16, current continues to flow through the diode during the remaining portion of the half-cycle. This current biases the diode in its second stable state until the magnitude of the voltage waveform decreases to the point where the diode current is reduced to the valley current level $I_v$. At this time, the diode is returned by this voltage to its first stable or low voltage state.

The firing point of a tunnel diode is characterized by a zone of uncertainty. This is a region wherein the internal noise of the diode influences the precise value of current required to fire it into its second state. At any point within the region, the diode may or map not fire during a particular cycle although the firing probability increases as the region is traversed. The zone of uncertainty is shown in FIG. 2 centered about the peak current $I_p$ and for a 1 ma. tunnel diode this zone has a width of about 2 $\mu$a.

The peak of the output waveform appearing at terminal 16 is affected not only by the inherent uncertainty of the diode, but also by the fact that the voltage drop across the diode, when in its second state, is at least equal to the valley voltage $V_v$. The peak voltage $V_p$ is on the order of 50 mv. and may be compensated for by the introduction of an equivalent D.C. bias in series therewith to reference the diode cathode to ground. In practice, however, any error resulting from the voltage appearing across the diode for a 6 volt peak waveform is generally insignificant.

Tunnel diode 12 is operated in the first quadrant of the characteristic at each negative half-cycle of the signal at terminal 16. The resistor $R_{11}$ is selected to have a magnitude such that at the desired peak of the output waveform, the current flowing into diode 12 is equal to $I_p$ and the diode is triggered into its second stable state. As the half-cycle continues, the current drops toward and below $I_v$ thereby automatically resetting the diode in its first state. For applications wherein the waveform does not return to zero, a reset pulse may be externally applied to the diode each cycle. The votlage appearing across the diode is in the form of a pulse. The pulse magnitude is substantially the same for each firing and is determined by the diode loading which comprises resistor $R_{11}$ and amplifier 13.

The pulse developed across diode 12 is fed to buffer amplifier 13 and then to the low-pass filter or integrator comprising resistor $R_{14}$ and capacitor $C_{15}$. The amplifier may be a two-stage D.C. coupled transistor amplifier of conventional design, such that a negative pulse appears at the collector of the second stage when the transistor of the first stage is driven on by applying the negative pulse appearing across the tunnel diode to the base of the transistor.

Figure 3:
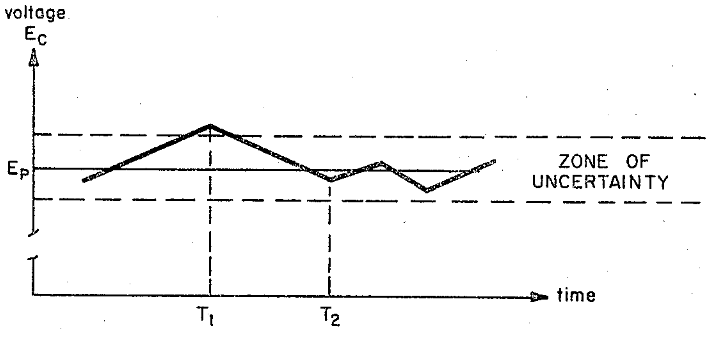
FIG. 3 is a graph of the voltage appearing across the capacitor of FIG. 1.

The capacitor $C_{15}$ charges in a negative sense to invert the effect of a firing each time the tunnel diode fires with the voltage $E_c$ appearing thereacross as shown in FIG. 3. In the steady state the D.C. component of voltage $E_c$ must equal the nominal peak output voltage $E_p$ appearing at terminal 16. The voltage source $E_1$ is made approximately twice $E_p$ so that the number of diode firings relative to non-firings is normally the same for the situation where the charge and discharge rates of capacitor $C_{15}$ are substantially equal and the duty cycle of the tunnel diode is about 50 percent of the output waveform period. The circuit is thus set in the middle of its dynamic range ready to decrease or increase $E_c$, as required, by an unbalance in the relative firing and non-firings. The A.C. component is a function of the charge and discharge rates of the capacitor, the magnitude of the amplifier output pulse and the number of firings relative to the number of times the diode does not fire. The feedback loop is returned directly to the waveform generator output, with switch $S_1$ closing at the time of the positive peak of the output waveform. Alternatively, the capacitor voltage $E_c$ may be used to modulate the power supply of the waveform generator without regard to the particular D.C. level thereof.

The A.C. component of voltage $E_c$ is shown increasing prior to time $T_1$ corresponding to few firings in this period. At time $T_1$, the capacitor voltage $E_c$ being fedback to generator 10 has resulted in an increase in the negative peak of the waveform at terminal 16 by an amount sufficient to increase the current through diode 15 above the nominal firing current magnitude $I_p$. Thus, the number of firings is substantially increased and the voltage $E_c$ begins to decrease until time $T_2$ whereupon the process is reversed. It will be noted that the voltage $E_c$ may have small excursions outside the zone due to the unpredictability of the diode firing.

In reference to FIG. 1, the charge time of capacitor $C_{15}$ is determined primarily by resistors $R_{14}$ and $R_{18}$ with the discharge time additionally influenced by the effective resistance of the tank circuit 17 as seen when switch $S_1$ is closed. The time constants are selected to be substantially longer than the period of the output signal at terminal 16. Since the ratio of the peak diode current $I_p$ to the width of the zone of uncertainty is of the order of 1000, the ratio of time constant to the period of control signal should also be of the order of 1000. This confines the swings of capacitor voltage $E_c$ for an individual firing time to a magnitude equal to the zone of uncertainty. By further increasing the time constant, the capacitor voltage is decreased when the diode fires and increases when it does not, but the change in voltage is small for individual firings. This tends to confine the swings of the capacitor voltage to within a range of the order of the diode zone of uncertainty.

In practice, the time constant should not be made unduly large since the voltage across the capacitor is to be responsive to changes in the firing point of diode 12. In one embodiment in which the control signal frequency was 2.5 megacycles with a period of 0.4 microsecond, a time constant of the order of 10 milliseconds enabled a 6 volt control signal to be maintained within a range of a few tenths of a percent. Since the thermal time constant of tunnel diodes is generally within the range of 1 to 10 milliseconds, it is found that changes in the firing point of tunnel diode 12 are compensated for by a corresponding change in voltage $E_c$ by providing a time constant for capacitor $C_{15}$ of the same order.

An increase in the firing point of diode 12 causes fewer diode firings and as a result the capacitor voltage increases and the amplitude of the control signal of terminal 16 also increases. A decrease in the firing point provides the opposite effect. Hence, by matching the diode 12 of the control signal generator to the tunnel diode of a comparator and using the control signal as the operating bias thereof, an amplitude comparison circuit of substantially constant sensitivity may be provided.

Figure 4:
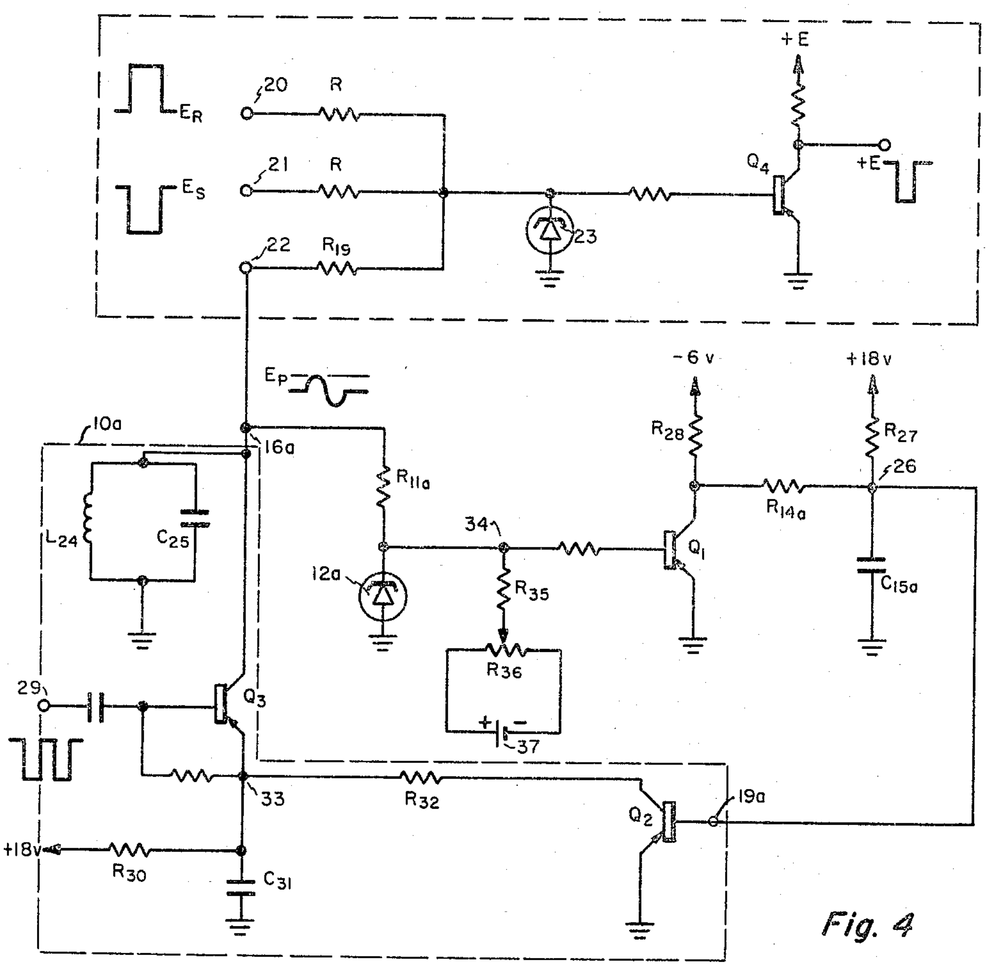
FIG. 4 is a schematic diagram of an amplitude comparator circuit constructed in accordance with the invention.

Referring now to the circuit diagram of FIG. 4, an amplitude comparison circuit is shown constructed in accordance with the invention. The portion of the circuit enclosed by the dotted lines is a conventional tunnel diode comparator wherein a reference signal, an analog signal and a control signal are applied to terminals 20, 21 and 22 respectively. The control signal is selected for this embodiment to be 0.95 of the peak current required to fire tunnel diode 23 and if the magnitude of the analog signal exceeds the reference signal by an amount sufficient to add 0.05 of the peak current of the diode, the diode fires.

The diode 23 is connected to the base of normally-off transistor $Q_4$ such that when it fires the collector potential of the transistor drops and an output pulse is developed. The remainer of the control signal cycle then resets diode 23 to its low voltage state. The output of transistor $Q_4$ can then be "anded" with clock pulses and supplied to further signal processing circuits as desired. In this embodiment, a 1 milliampere tunnel diode was used to provide sufficient energy to render transistor $Q_4$ conductive with the control signal being set at 0.95 milliampere.

However a change in temperature may either increase or decrease the firing level of diode 23, resulting in an undesirable variation in the sensitivity of the comparator. In addition, for the embodiment shown a decrease of 0.05 of the peak firing current can result in the diode being fired by the control signal alone. These disadvantages can be essentially eliminated by matching tunnel diode 23 with tunnel diode 12*a* of the control signal generator to insure tracking therebetween so that the sensitivity of the comparison is maintained substantially constant. As the two tunnel diodes have equal firing levels, the magnitude of resistor $R_{19}$ may be chosen so that at the desired control signal peak, the current flow is 0.95 of the diode firing level or in this embodiment 0.95 milliampere.

The control signal generator portion of the comparison circuit of FIG. 4 is shown comprising a parallel resonant circuit containing inductor $L_{24}$ and capacitor $C_{25}$ and having a resonant frequency of 2.56 megacycles. This is the frequency of the control signal and may be changed for different applications. The output of the resonant circuit is supplied to terminal 16*a* and across the series combination of resistor $R_{11a}$ and tunnel diode 12*a*. Since the desired control signal peak in this embodiment is 6 volts, resistor $R_{11a}$ was selected to be 6 kilo-ohms for a 1 milliampere firing current.

Figure 5:
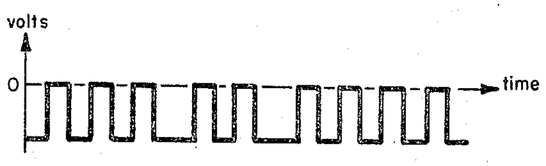
FIGS. 5, 6 and 7 show representative voltage waveforms occurring at different points in the embodiment of FIG. 4.
Figure 6:
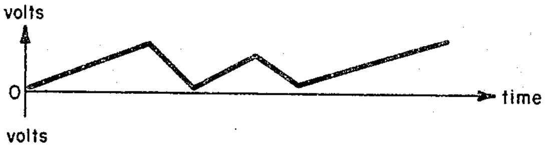

When tunnel diode 12*a* fires, the voltage at the base of transistor $Q_1$ is driven negative and the transistor is turned on with a positive pulse appearing at the collector. This pulse is then applied to a first low-pass filter or integrator comprising essentially resistor $R_{14a}$ and capacitor $C_{15a}$. It is to be noted that terminal 26 is connected to a positive potential through resistor $R_{27}$. This manner of connection establishes the operating bias for transistor $Q_2$, for example $+\frac{1}{2}$ volt, while permitting integrated positive pulses to appear across capacitor $C_{15a}$ when transistor $Q_1$ is driven on. The wave forms of FIGS. 5 and 6 show the pulses appearing at the collector of transistor $Q_1$ and the integration thereof appearing at terminal 26.

This first low-pass filter is selected to have a time constant of about 0.5 millisecond and serves to limit the amplitude of the voltage applied to transistor $Q_2$. The filter output is applied directly to the base of normally conductive transistor $Q_2$. The positive signal appearing across the capacitor drives transistor $Q_2$ in a direction to increase its conductivity. However, the voltage limiting aspect of the first integrator prevents the transistor from becoming saturated.

Returning now to the resonant circuit, energy is applied thereto each cycle when transistor $Q_3$ is driven on by the application of negative clock pulses to terminal 29 and thus to the transistor base. As shown, the emitter of transistor $Q_3$ is connected to a positive supply through resistor $R_{30}$. Driving transistor $Q_3$ on at the time of the positive peak of the control signal supplies the energy necessary to sustain the oscillations in the resonant circuit and minimizes any transient effect at the time of the firing of the tunnel diode. The transistor $Q_3$ shown in FIG. 3 corresponds to switch $S_1$ in FIG. 1.

The emitter of transistor $Q_3$ is tied through resistor $R_{32}$ to the collector of the continually conducting transistor $Q_2$. As mentioned previously, the conductivity of transistor $Q_2$ is controlled by the voltage of capacitor 15*a* so that the amount of energy supplied to the resonant circuit is greatest when transistor $Q_{12}$ is least conductive or is an inverse function of the capacitor voltage.

Figure 7:
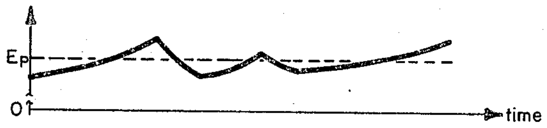

The terminal 33 is connected to the positive source through a low-pass filter having a time constant of about 10 milliseconds and comprising substantially capacitor $C_{31}$ and resistor $R_{30}$. During the intervals between clock pulses, i.e. when transistor $Q_3$ is off, capacitor $C_{31}$ charges to a voltage determined by the amount of current passing through transistor $Q_2$. The wave form generator 10 of FIG. 1 is shown as generator 10*a* in the embodiment of FIG. 4 and comprises the resonant circuit and the transistor switch $Q_3$. In addition, the waveform generator includes both the low-pass filter comprising capacitor $C_{31}$ and resistor $R_{30}$ and the normally conductive transistor $Q_2$. The control terminal 19 of the waveform generator is coupled to the base of transistor $Q_2$. As mentioned previously, the conductivity of this transistor is modulated by the output of the first low-pass filter or integrator. In this embodiment, the resistors $R_{30}$ and $R_{32}$ were made 560 and 100 ohms respectively, with capactor $C_{31}$ selected to be 25 microfarads to insure that sufficient energy would be available when transistor $Q_3$ was driven on. This filter in effect integrates the changes in conductivity of transistor $Q_2$ such that the voltage appearing thereacross is as shown by the wave form of FIG. 7 in which the D.C. level is $E_p$ or 6 volts.

Since tunnel diodes 12*a* and 23 are matched, a variation in the value of peak current required to fire them is automatically compensated for. This is readily seen by considering that a decrease in firing level causes an increase in the number of firings of diode 12*a* which in turn increases the capacitor voltage $E_c$. This affects the amount of energy supplied to the reasonant circuit and causes a decrease in the magnitude of the peak control signal until a new level is reached wherein the current flowing into diode 12*a* is again confined essentially to the zone of uncertainty. The opposite effect occurs for an increase in tunnel diode firing level.

The variation in the magnitude of the control signal applied to terminal 22 of the comparator is substantially equal to the change in firing level of the decision-making tunnel diode 23. Hence the amplitude comparison circuit remains at a substantially constant sensitivity generally unaffected by temperature variations.

If desired the magnitude of the control signal may be altered by the introduction of a bias current at connecting point 34 through resistor $R_{35}$ and tapped resistor $R_{36}$ from bias supply 37. A negative bias current reduces the current flow through $R_{11a}$ required to fire the diode without changing the operation of the feedback loop. This can be used, for example, when the comparator resistor $R_{19}$ is such as to permit the peak current to flow to diode 23 at the desired control signal magnitude, to add 0.05 milliampere to the current flow through diode 12*a*. This serves to decrease the magnitude of the control signal such that it supplies 0.95 milliampere to diode 23. Adjustment of the tapped resistor $R_{36}$ also enables the operating bias of the comparator to be readily changed to a value other than 0.95.

While the above description has been with reference to specific embodiments, it is understood that many changes and modifications may be made without departing from the spirit and scope of the invention.

What is claimed is:

1. A control signal generator which comprises
(a) means for generating an output waveform at the control frequency of interest, said generating means having first and second output terminals and a control terminal,
(b) impendance means connected to said first output terminal,
(c) a tunnel diode reference element having first and second stable states connected in series with said impendance means and said second output terminal, said tunnel diode being triggered into its second stable state when the output of said generating means exceeds a predetermined magnitude and reset to its first stable state by the remaining portion of the output waveform, and
(d) integrating means having an input and an output, said input being connected across said tunnel diode reference element, the output of said integrating means being connected to the control terminal of said waveform generator to maintain the magnitude of the output waveform substantially constant.

2. A control signal generator which comprises
(a) means for generating an output waveform at the control frequency of interest, said generating means having first and second output terminals and a control terminal,
(b) resistance means connected to said first output terminal,
(c) a tunnel diode reference element having first and second stable states connected in series with said resistance means and said second output terminal, said tunnel diode being triggered into its second stable state when the output of said generating means exceeds a predetermined magnitude,
(d) means connected to said tunnel diode for resetting said diode into its first stable state, and
(e) integrating means having an input and an output, said input connected across said tunnel diode reference element, the output of said integrating means being connected to the control terminal of said waveform generator to maintain the magnitude of the output waveform substantially constant.

3. A control signal generator which comprises
(a) means for generating an output waveform at the control frequency of interest, said generating means having first and second output terminals and a control terminal,
(b) resistance means connected to said first output terminal,
(c) a tunnel diode reference element having first and second stable states connected in series with said resistance means and said second output terminal, said tunnel diode being triggered into its second stable state when the output of said generating means exceeds a predetermined magnitude and reset to its first stable state by the remaining portion of the output waveform, and
(d) integrating means having an input and an output, said input being connected across said tunnel diode reference element, said integrating means having a time constant substantially greater than the period of said output waveform, the output of said integrating means being coupled to the control terminal of said waveform generator to maintain the magnitude of the output waveform substantially constant.

4. A control signal generator which comprises
(a) means for generating an output waveform at the control frequency of interest, said generating means having first and second output terminals and a control terminal,
(b) resistance means connected to said first output terminal,
(c) a tunnel diode reference element having first and second stable states connected in series with said resistance means and coupled to said second output terminal, said tunnel diode being triggered into its second stable state when the current therethrough substantially equals the tunnel diode firing current, said resistance means having a magnitude such that when the output waveform equals a predetermined magnitude the current flow therethrough is substantially equal to the tunnel diode firing current, said tunnel diode being reset by the following portion of said output waveform,
(d) amplifying means coupled to the connecting point of the resistance means and the tunnel diode for amplifying and inverting the output pulses appearing across said tunnel diode,
(e) integrating means having an input and output, said input being connected to the output of said amplifying means, said integrating means having a time constant substantially greater than the period of said output waveform, the output of said integrating means being coupled to the control terminal of said generating means to maintain the magnitude of the output waveform substantially constant at said predetermined magnitude.

5. A control signal generator which comprises
(a) means for generating an output waveform at the control frequency of interest, said generating means having first and second output terminals and a control terminal,
(b) resistance means connected to said first output terminal,
(c) a tunnel diode reference element having first and second stable states connected in series with said resistance means and said reference terminal, said tunnel diode being triggered into its second stable state when the current therethrough equals or exceeds the tunnel diode firing current,
(d) biasing means connected to said reference tunnel diode for supplying a biasing current thereto, said tunnel diode being triggered when the sum of said biasing current and the current through said resistance means substantially equals the tunnel diode firing current, said tunnel diode being reset by the following portion of said output waveform, (e) amplifying means coupled to the connecting point of the resistance means and the tunnel diode for amplifying and inverting the output pulses appearing across said tunnel diode, and (f) integrating means having an input and output, said input coupled to the output of said amplifying means, said integrating means having a time constant substantially greater than the period of said output waveform, the output of said integrating means being coupled to the control terminal of said generating means to maintain the magnitude of the output waveform substantially constant.

6. A control signal generator which comprises (a) means for generating an output waveform at the control frequency of interest, said generating means having an output terminal, a control terminal and a reference terminal, (b) resistance means connected to said output terminal, (c) a tunnel diode reference element having first and second stable states connected in series with said resistance means and said reference terminal, said tunnel diode being triggered into its second state when the current therethrough substantially equals the tunnel diode firing current and reset when the current therethrough equals the tunnel diode valley current, the tunnel diode firing current being characterized by a zone of uncertainty wherein the probability of the diode firing for currents within said zone varies as the zone is traversed, the magnitude of said resistance means being such that when the output waveform is equal to a predetermined magnitude the current flow therethrough is equal to the tunnel diode firing current, said tunnel diode being reset by the following portion of said output waveform, (d) amplifying means coupled to the connecting point of the resistance means and the tunnel diode for amplifying and inverting the output pulses appearing across said tunnel diode, and (e) integrating means having input, output and reference terminals, the reference terminal being coupled to said generating means reference terminal and said input terminal being coupled to the output of said amplifying means, said integrating means having a time constant at least as large as the product of the control signal period and the ratio of the tunnel diode firing current to the width of the zone of uncertainty, the output terminal of said integrating means being coupled to the control terminal of said generator means to maintain the magnitude of the output waveform substantially constant.

7. A control signal generator which comprises (a) oscillator means having first and second output terminals for generating an output signal at the control frequency of interest, (b) power supply means connected across said oscillator means for sustaining the oscillations thereof, (c) resistance means connected to said first output terminal, (d) a tunnel diode reference element having first and second stable states connected in series with said resistance means and said second output terminal, said tunnel diode being triggered into its second stable state when the current therethrough substantially equals the tunnel diode firing current, the tunnel diode firing current being characterized by a zone of uncertainty wherein the probability of the diode firing for currents within said zone varies as the zone is traversed, said diode being reset to its first state when the current therethrough is less than the tunnel diode valley current, (e) amplifying means coupled to the connecting point of the resistance means and the tunnel diode for amplifying and inverting the output pulses appearing across the tunnel diode, (f) integrating means having an input and an ouput, said input being coupled to the output of said amplifying means, said integrating means having a time constant at least as large as the product of the control signal period and the ratio of the tunnel diode firing current to the width of the zone of uncertainty, and (g) a normally conducting transistor having an emitter, base and collector, the emitter being coupled to a voltage source, the collector being coupled to said power supply means and the base being coupled to the output of said integrating means to modulate the conductivity of said transistor, the power supplied to said oscillator means being modulated by the conductivity of said transistor to maintain the magnitude of the oscillator output signal substantially constant.

8. An amplitude comparison circuit which comprises (a) a first tunnel diode having first and second stable states, said diode being triggered into its second state when the current therethrough is substantially equal to the diode firing current and reset when said current is less than the diode valley current, (b) resistive means connected in series with said first tunnel diode, (c) means connected across said restrictive means and said first tunnel diode for applying the signal to be compared thereacross, (d) means connected across said resistive means and said first tunnel diode for applying the reference waveform thereacross, (e) means for generating a control signal having first and second output terminals and a control terminal, said output terminals being connected across said resistive means and said first tunnel diode, said control signal establishing the operating bias of said first diode and having a predetermined magnitude differing from that required to trigger said diode into its second state, said diode being triggered when the sum of said compared signal, reference waveform and operating bias provide a current therethrough substantially equal to the tunnel diode firing current, (f) resistance means connected to said first output terminal, (g) a tunnel diode reference element having first and second stable states connected in series with said resistance means and said second output terminal, said tunnel diode being triggered into its second stable state when the current therethrough equals or exceeds the tunnel diode firing current, (h) biasing means connected to said reference tunnel diode for supplying a biasing current thereto, said tunnel diode being triggered when the sum of said biasing current and the current through said resistance means substantially equals the tunnel diode firing current, said tunnel diode being reset by the following portion of said output waveform, (i) amplifying means coupled to the connecting point of the resistance means and the tunnel diode for amplifying and inverting the output pulses appearing across said tunnel diode, and (j) integrating means having an input and an output, said input coupled to the output of said amplifying means, said integrating means having a time constant substantially greater than the period of said output waveform, the output of said integrating means being coupled to the control terminal of said generating means to maintain the magnitude of the output waveform substantially constant.

9. An amplitude comparison circuit in accordance with claim 8 in which said first tunnel diode and said tunnel diode reference element are matched to have substantially identical temperature variation characteristics.

10. An amplitude comparison circuit which comprises (a) a first tunnel diode having first and second stable states, said diode being triggered into its second state when the current therethrough is substantially equal to the diode firing current and reset when said current is less than the diode valley current, (b) resistive means connected in series with said first tunnel diode, (c) means connected across said resistive means and said first tunnel diode for applying the signal to be compared thereacross, (d) means connected across said resistive means and said first tunnel diode for applying the reference waveform thereacross, (e) means for generating a control signal having an output terminal, a reference terminal and a control terminal, said output and reference terminals being connected across said resistive means and said first tunnel diode, said control signal establishing the operating bias of said first diode and having a predetermined magnitude differing from that required to trigger said diode into its second state, said diode being triggered when the sum of said compared signal, reference waveform and operating bias provide a current therethrough substantially equal to the tunnel diode firing current, (f) resistance means connected to said output terminal, (g) a tunnel diode reference element matched with said first tunnel diode and having first and second stable states, said reference tunnel diode being connected in series with said resistance means and said reference terminal, said tunnel diode being triggered into its second state when the current therethrough substantially equals the tunnel diode firing current and reset when the current therethrough equals the tunnel diode valley current, the tunnel diode firing current being characterized by a zone of uncertainty wherein the probability of the diode firing for currents within said zone varies as the zone is traversed, the magnitude of said resistance means being such that when the output waveform is equal to said predetermined magnitude the current flow therethrough is equal to the tunnel diode firing current, said tunnel diode being reset by the following portion of said output waveform, (h) amplifying means coupled to the connecting point of the resistance means and the tunnel diode for amplifying and inverting the output pulses appearing across said tunnel diode, and (i) integrating means having input, output and reference terminals, the reference terminal being coupled to said generating means reference terminal and said input terminal being coupled to the output of said amplifying means, said integrating means having a time constant at least as large as the product of the control signal period and the ratio of the tunnel diode firing current to the width of the zone of uncertainty, the output terminal of said integrating means being coupled to the control terminal of said generator means to maintain the magnitude of the output waveform substantially constant.

References Cited

UNITED STATES PATENTS

| | | | |
|---|---|---|---|
| 3,108,218 | 10/1963 | Butler et al. | 307—88.5 X |
| 3,127,526 | 3/1964 | Bishop | 307—88.5 |

ARTHUR GAUSS, *Primary Examiner.*

J. JORDAN, *Assistant Examiner.*